(12) United States Patent
Beilinson et al.

(10) Patent No.: US 7,818,789 B2
(45) Date of Patent: *Oct. 19, 2010

(54) USER CONTROLS FOR A COMPUTER

(75) Inventors: Craig Adam Beilinson, Bellevue, WA (US); Raymond J. Chen, Redmond, WA (US); Ramkumar Ramasubramanian, Bellevue, WA (US); Dennis L. Davis, Bothell, WA (US); Christopher A. Evans, Sammamish, WA (US); Eric R. Flo, Sammamish, WA (US); Sterling M. Reasor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/019,438

(22) Filed: Jan. 24, 2008

(65) Prior Publication Data

US 2008/0120693 A1 May 22, 2008

Related U.S. Application Data

(62) Division of application No. 10/186,014, filed on Jun. 28, 2002, now Pat. No. 7,356,836.

(51) Int. Cl.
*G06F 21/00* (2006.01)
*G06F 15/16* (2006.01)

(52) U.S. Cl. .................... 726/4; 726/1; 726/17
(58) Field of Classification Search ................ None
See application file for complete search history.

(56) References Cited

U.S. PATENT DOCUMENTS

| | | | |
|---|---|---|---|
| 5,881,225 A | 3/1999 | Worth | |
| 6,044,471 A * | 3/2000 | Colvin | 726/28 |
| 6,122,741 A | 9/2000 | Patterson et al. | |
| 6,158,010 A | 12/2000 | Moriconi et al. | |
| 6,170,065 B1 * | 1/2001 | Kobata et al. | 714/7 |
| 6,223,289 B1 | 4/2001 | Wall et al. | |
| 6,408,336 B1 | 6/2002 | Schneider et al. | |
| 6,543,004 B1 | 4/2003 | Cagle et al. | |
| 7,181,618 B2 | 2/2007 | Daniell et al. | |
| 7,356,836 B2 | 4/2008 | Beilinson et al. | |
| 2005/0008163 A1 * | 1/2005 | Leser et al. | 380/281 |
| 2005/0028006 A1 * | 2/2005 | Leser et al. | 713/200 |

(Continued)

OTHER PUBLICATIONS

Stanek, William R., "Microsoft Windows 2000 Administrator's Pocket Consultant," 2000, 24 pp.

(Continued)

*Primary Examiner*—Christopher A Revak
(74) *Attorney, Agent, or Firm*—Shook Hardy & Bacon LLP

(57) ABSTRACT

This invention is directed to provide a method for enabling an administrator to monitor and selectively limit the computer functions available to a user. The method is carried out on a personal computer by an administrator, and administrator decisions can be enforced on other personal computers in a local network. The invention enables an administrator to restrict a user's logon hours, logon duration, access to computer functions, and access to applications based on content rating. In addition, the administrator may temporarily restrict or extend normally allowed access privileges. The invention also allows for the monitoring, auditing, and reporting of a user's computer function usage to an administrator.

19 Claims, 6 Drawing Sheets

U.S. PATENT DOCUMENTS

2007/0157288 A1* 7/2007 Lim .................. 726/1
2007/0167182 A1* 7/2007 Tenhunen et al. ........... 455/512
2007/0169168 A1* 7/2007 Lim .................. 726/1
2008/0060051 A1* 3/2008 Lim .................. 726/1
2008/0066149 A1* 3/2008 Lim .................. 726/1

OTHER PUBLICATIONS

Microsoft Windows 2000 Server, "Windows 2000 Group Policy," White Paper, 2000, 137 pp.

Microsoft Windows 2000 Server, "Managing Enterprise Policies with FAZAM 2000," White Paper, V. 2.1, Nov. 17, 2000, Full Armor, 23 pp.

Haney, Julie M., Guide to Securing Microsoft Windows 2000 Group Policy, NSA, V.1.1, updated Sep. 13, 2001, Report No. C4-007R-01, Unclassified, 33 pp.

Stanek, William R., "Managing Existing User and Group Accounts," from Chapter 9, Microsoft Windows 2000 Administrator's Pocket Consultant, 2000, 12 pp.

Notice of Allowance, mailed Jun. 10, 2010, in U.S. Appl. No. 12/037,729, 4 pp.

Final Office Action, mailed Feb. 24, 2010, in U.S. Appl. No. 12/037,729, 5 pp.

Nonfinal Office Action, mailed Sep. 23, 2009, in U.S. Appl. No. 12/037,729, 9 pp.

Terminal Disclaimer, dated May 24, 2010, in U.S. Appl. No. 12/037,729, 1 page.

* cited by examiner

USER CONTROLS FOR A COMPUTER

CROSS-REFERENCE TO RELATED APPLICATIONS

This application is a divisional of and claims priority from nonprovisional application Ser. No. 10/186,014, which is now U.S. Pat. No. 7,356,836, filed Jun. 28, 2002, and entitled "User Controls For A Computer." application Ser. No. 10/186,014 is incorporated herein in its entirety.

STATEMENT REGARDING FEDERALLY SPONSORED RESEARCH OR DEVELOPMENT

Not Applicable.

TECHNICAL FIELD

The present invention relates to computer systems and, more particularly, to a system and method for monitoring and selectively limiting computer functions available to a user.

BACKGROUND OF THE INVENTION

Parents want to control their children's computer experience in the home. Home computers can increase learning rates and task efficiencies. However, children often show a greater appreciation for the nearly limitless types of entertainment and recreation provided by home computers and the Internet. Computers offer increasing capabilities that parents may wish to monitor: DVD players, CD players, live chat rooms, local and network games, emails, shopping sites, web surfing, etc. Unfortunately, current parental control features with respect to computers are limited. Parents currently may impose some restrictions on Internet usage and some application usage. In addition, these restrictions are machine-specific and do not roam as a child uses a different computer.

Parents want the ability to extend computer privileges to their children in a similar fashion as any other privilege. A child is generally given few privileges and is monitored constantly when young. As the child matures, she may be allowed additional computer privileges. Parents want their children to be protected and yet have freedoms and responsibilities corresponding to their maturity. To this end, parents need the ability to incrementally allow children access to appropriate functions of a home PC. They also need to be able to temporarily extend or curtail these privileges. The parental controls should also be consistent for a child for every machine in the house. To date, no solution exists which can offer parents such capabilities.

BRIEF SUMMARY OF THE INVENTION

This invention addresses the limitations in existing user or parental control features for computers by providing a method for enabling someone such as a computer system administrator or parent to monitor and selectively limit the availability and activity of computer functions operated by a user, such as a child. The implementation of such a system includes restricting a user's logon hours, logon duration, access to computer functions, and access to applications. In addition, the implementation of such a system includes enabling an administrator to temporarily restrict or extend a user's normally allowed access privileges as well as monitor, audit, and obtain reports of a user's computer function usage.

Once the invention is integrated into a computer system, an administrator configures user authorization settings for all users. Examples of computer functions include executing software applications such as word processors or games, playing CDs and DVDs, and storing data such as on 3.5" disk drives, writable CDs, and hard disk drives. The user authorization settings assigned to the user by the administrator on a computer are capable of being replicated on another computer and are intended to follow the user from computer to computer in the local network.

An administrator can impose restrictions on a user by restricting all computer functions or by restricting specific computer functions. To restrict all computer functions, an administrator may restrict a user's logon status based on several factors including time of day, duration, and account standing. An administrator may disallow logon status based on time of day, which involves restricting a user's access by denying system logon status except during administrator defined allowable hours of operation. An administrator may limit the duration of logon status, which involves restricting access of a user by monitoring system logon status and denying use of computer functions once the duration of user logon time equals or exceeds an administrator defined allowable duration per day or other time interval. An administrator may disallow logon status due to a temporary suspension of all user computer privileges, which involves disabling a user's account and determining when the account availability will be automatically restored.

An administrator may also restrict a user's access to specific computer functions. The invention allows an administrator the ability to deny a user all computer functions except those specifically enabled by the administrator. This effectively controls new functions that are added after the administrator configures the system. In addition, the administrator may restrict a user's access to computer functions based on several factors including time of day, elapsed process time for a specific computer function, and content rating of the requested computer function. In this regard, the content rating controls whether the user may access the computer function. An administrator may temporarily restrict access to a specific computer function, which involves disabling a user's access to the function and determining when access to the function will be automatically restored.

For every restriction, desired data is collected which can be distilled into reports on total system usage, computer function usage, function process time, unsuccessful computer function usage attempts and the like. The administrator may apply various filters to the raw data in order to generate reports containing only desired information. For example, the administrator could select a computer function as having a high priority for monitoring so that information concerning a user's use of that function appears at the front of a report about the user's usage. The administrator is further provided with the ability to monitor a user's activity via a read-only view of a user's computer display. The user may be alerted to the viewing.

The user is provided with an option to request additional access to computer functions from the administrator. The administrator can then grant or deny the request. After an unsuccessful attempt to access computer functions due to restrictions set by administrator, the user may automatically be presented with the option of requesting a temporary privilege increase from the administrator.

BRIEF DESCRIPTION OF THE SEVERAL VIEWS OF THE DRAWINGS

These and other objectives and advantages of the present invention will be more readily apparent from the following detailed description of the drawings of the embodiment of the invention that are herein incorporated by reference and in which.

DETAILED DESCRIPTION OF THE INVENTION

Figure 1:
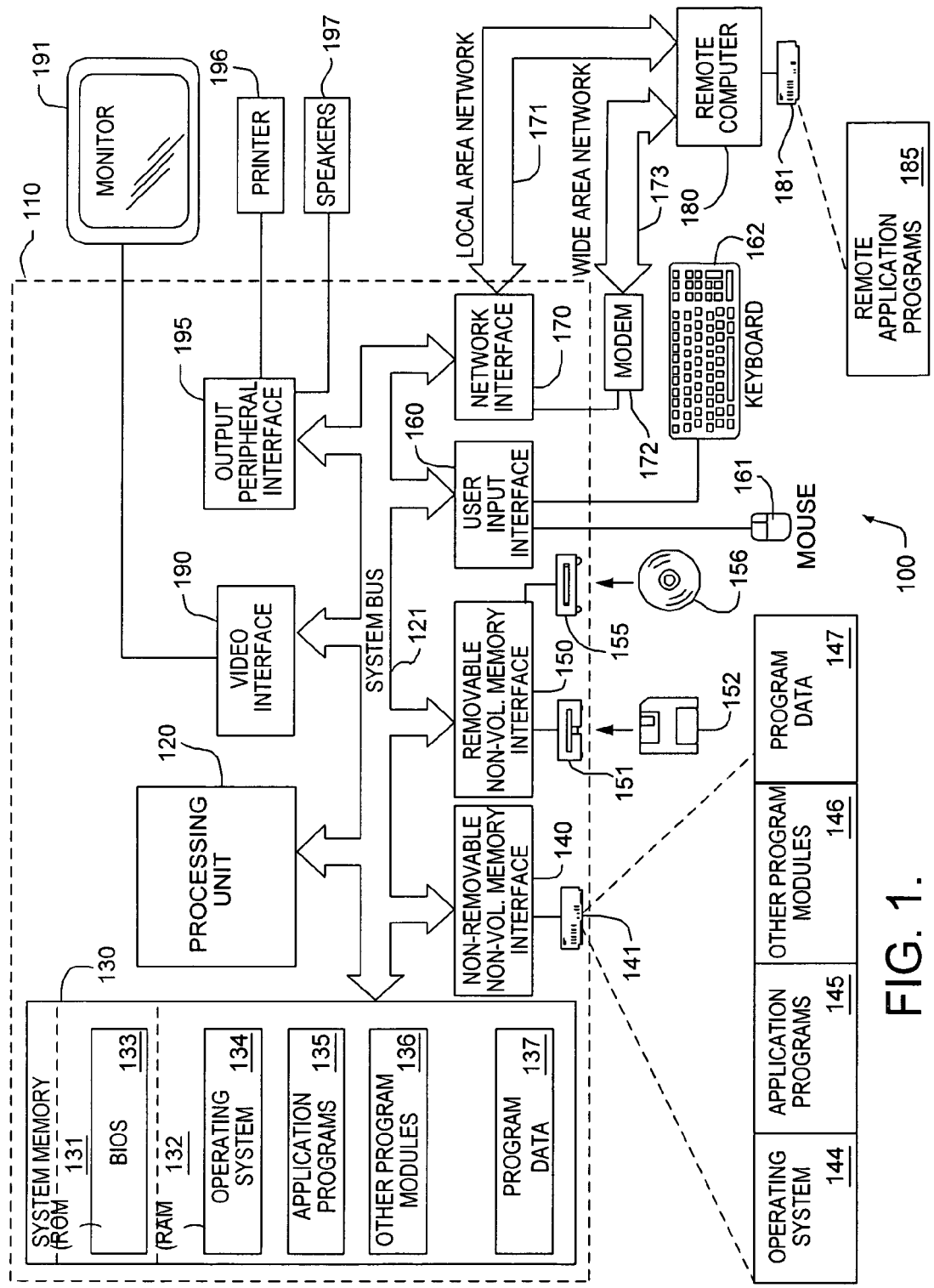
FIG. 1 is a block diagram of a computing system suitable for use in implementing the present invention on a computer.

The present invention introduces a method for controlling and monitoring user access to computer functions. This invention allows an individual, such as an administrator, to impose restrictions on other computer users. This invention could be used by parents to help control, protect and guide a child's computer experiences as they mature. This invention could also be used by corporate network administrators to encourage efficiency and remove unnecessary distractions. Small business owners could also benefit from the invention. The invention would allow several employees that use the same computer, such as the accountant, payroll manager, and sales clerk, to have access to the programs they need while reducing the opportunity to interfere with the work of another employee.

The present invention is implemented on a computer having an operating system and a communications link to other computers. The invention creates configurable system controls ("controls") for all computer users ("user or users"). Once the controls have been configured, the configured controls are a user's user authorization settings ("settings"). The settings assigned to the user on a computer are capable of being replicated on other computers and are intended to follow the user from computer to computer. The invention relies on information in a user's settings for conducting the functions of monitoring, auditing, and restricting a user's activity. Information stored in the settings can also allow exception handling of the restrictions.

For every restriction, user activity data is collected and can be distilled into reports. The invention provides a method to apply various filters to the user activity data. The invention further provides a method to monitor a user's activity via a read-only view of a user's computer display.

The invention also provides a system and method to impose restrictions on a user by restricting logon status or by restricting specific computer functions. Restricting a user's logon status restricts a user's access to all computer functions. The invention allows for the restriction of a user's logon status based on several factors including time of day, duration per day, and account standing. Function name, time of day, content rating and duration per day are used to restrict a user's access to specific functions.

The invention allows for user privileges to be temporarily reduced and temporarily increased. A user may initiate a request for a temporary privilege increase. This request can be granted or denied. If granted, the user may be informed of their new privileges and the duration the additional privileges will exist. If a user's privileges are temporarily curtailed, the user again may be informed of the extent and duration of the reduction.

Once the controls for system users have been configured, the controls are stored as group policy objects ("GPOs"). The operating system is configured to send the GPOs to other computers that have a communications link, such as other computers on the same network. In this way, all connected computers contain the same set of GPOs and, thus, the same user authorization settings for all users. When a user attempts to log on to the system, the computer checks to see if the user settings allow the user logon status. If so, the user is then free to attempt to access computer functions. The user's attempts to access computer functions will be subjected to any restrictions stored in the settings such as duration restrictions and the like.

Having briefly described an embodiment of the present invention, an exemplary operating system for the present invention is described below:

Exemplary Operating Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

User Controls for a Computer

The present invention is implemented on a computer system 100 ("system") having an operating system 134, such as the MICROSOFT WINDOWS family of operating system software, such as the MICROSOFT WINDOWS XP operating system produce, made by the Microsoft Corporation of Redmond, Wash. that contains, among other features and functions, Fast User Switching (FUS), LogonUI, Instant Messaging, Windows Firewall, Group Policy Objects (GPOs), the Windows kernel, and Remote Desktop. The invention could likewise be implemented on computer systems having other operating systems containing similar functionality.

In one embodiment, the present invention is part of the computer's operating system 134. In another embodiment, the invention runs as an application 135. In all embodiments, the present invention creates configurable system controls for all computer system users. Once the controls have been configured, the configured controls are a user's user authorization settings. The settings assigned to the user on a computer system are capable of being replicated on another computer system 181 and are intended to follow the user from computer system to computer system. As one skilled in the art would understand, the system authorization settings for a user could be transmitted between any two computer systems that have a communications link. This could be accomplished by creating group policy objects ("GPOs") containing the user authorization settings and having the operating system or other software replicate the GPOs across a local area network 171 such as a home network. The GPO could be implemented as an object in an object-oriented programming language, such a the MICROSOFT VISUAL C++ product. Alternatively, the GPO could be implemented as an Extensible Markup Language ("XML") document having tags corresponding to desired user identification and authorization settings. In the latter implementation, some form of encryption of the XML document could be advantageous to prevent unauthorized attempts to modify the GPO. The system authorization settings for a user could also be communicated across a wide area network 173.

Figure 2:
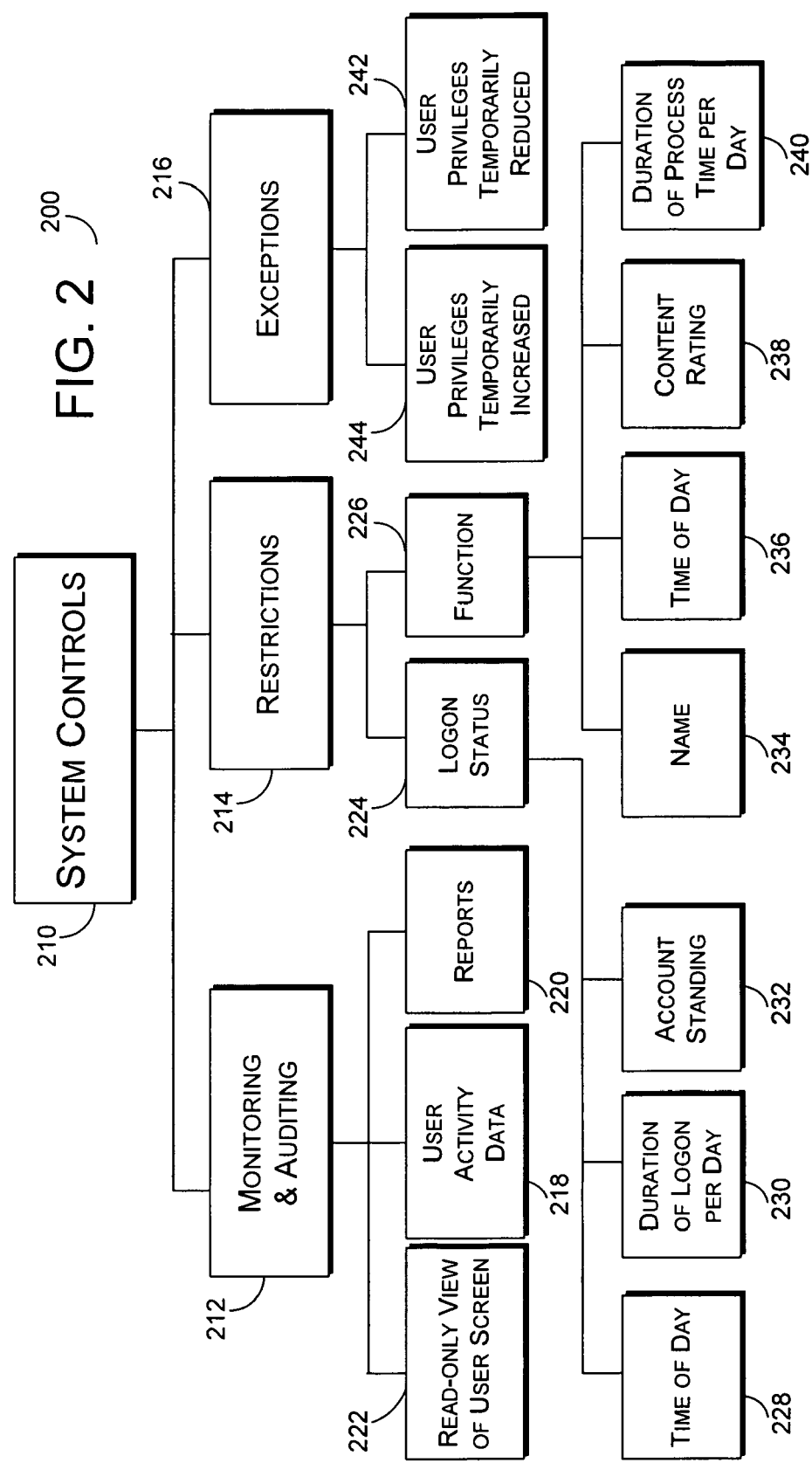
FIG. 2 is an overall block diagram of the present invention.

FIG. 2 is a block diagram that illustrates exemplary controls made available by the invention. The controls 210 include at least three components:

1. A monitoring and auditing component 212 to monitor and audit a user's activity;

2. A restrictions component 214 to restrict computer function usage of a user; and 3. An exceptions component 216.

Monitoring & Auditing

As stated above, one component of the controls 210 is a monitoring and auditing component 212. The monitoring and auditing component 212 is used to view a user machine by the administrator, to collect user activity data and to generate reports. These functions are described below.

For every restriction specified by restriction component 214, user activity data 218 is collected and stored in the system log of the user's computer. The user activity data can be distilled into reports 220 by monitoring and auditing component 212. For example, reports can be generated on total system usage, computer function usage, function process time, unsuccessful computer function usage attempts and the like. Other reports could be generated, and the invention is not limited to the particular reports generated.

The system controls 210 contain a list of the types of data that are collected on user activity. Each item on the list is selectable for the purpose of creating information filters. These filters are applied to the user activity data 218 to generate reports 220. The filters allow someone, such as an administrator, to generate reports containing only desired information. Reports are generated by extending the WINDOWS kernel to record the desired data on every user's computer. Structured Query Language (SQL) is then extended to work with a user interface that selects the data filtering. Data may be collected from multiple computers for the same user. Other methods of generating reports outside of the WINDOWS family of operating systems could also be used, as is known to those skilled in the art.

The monitoring component also functions to monitor a user's activity via a read-only view of a user's computer display 222. This portion of the monitoring component allows the administrator to view a window that displays what the user is seeing on their monitor. If desired, the user may be alerted to the viewing by the administrator. In one embodiment, the existing Windows Remote Desktop is extended to provide a read-only view of a target machine's display. Again, the viewing component 222 can be implemented in other operating systems. The importance lies in the ability to view a remote display at the administrator location. An administrator is thus allowed the opportunity to make certain a user is on task at their computer. For instance, a parent can discern whether a child is typing a history report in Microsoft Word or using the application for another purpose. A network administrator can also discern if a purchasing agent is using the Internet to buy parts for manufacturing or using the computer on personal matters. In addition, the operating system may be configured to automatically search for and find a user, who may be identified in a graphical manner, such as by the use of a user tile as in the MICROSOFT WINDOWS XP product. Thus, an administrator may select the desired user by clicking on the user tile for the user and thereby activate a Remote Desktop session.

Restrictions

The restrictions component 214 is used to impose restrictions on a user. The restrictions can generally be broken into two categories: a logon status category 224 and a function category 226.

The logon status category 224 is used to restrict a user's access to all computer functions. Sub-categories of logon status category 224 include, but are not limited to, such things as time of day 228, duration per day 230, and account standing 232.

Sub-category time of day 228 is used to deny system logon status except during allowable hours of operation as defined in the settings. As more fully described below, a parent can use sub-category 228 to set specific times during the day that a child is allowed to use the computer. Also, a computer system administrator for a business can limit an employee's allowable login hours to the hours that the employee regularly works.

Sub-category logon duration per day 230 is used to deny system logon status once the duration of user logon time equals or exceeds the allowable logon duration per day as defined in the settings. In this way, a child's daily computer usage can be limited to an amount defined by the parent. Sub-category account standing 232 is used to permanently disable a user account. For example, the user account can be disabled permanently by the administrator using sub-category account standing 232.

As one who is skilled in the art will understand, and as more fully described below, the above described logon status restrictions 224 can be imposed by and through a LogonUI, or logon user interface. In such an implementation, a LogonUI is directed to read the settings defined by the administrator to determine whether to allow or disallow a specific user to log on. Once logged on, the operating system is configured to eject users who have exceeded a limitation, such as the allowed daily access time or time of day. In such an ejection, a user's unsaved data can be lost. To protect against a loss of data, the LogonUI or other component can be instructed to first save any data prior to an ejection. For example, Microsoft Windows Fast User Switching technology can be used to ensure that a user's data will be available at their next successful logon attempt. In addition to saving data, Microsoft Windows Fast User Switching actually restores the state of the computer. The next time an ejected user completes a successful login attempt, the state of the computer returns to its state prior to ejection. For example, the same applications will be open, or the user's incomplete and unsaved email composition will still exist. Computer functions such as date and time will not, as is obvious, return to their state prior to user ejection.

As stated above, restriction component 214 can be used to restrict specific computer functions 226. The specific computer functions category 226 includes a number of sub-categories. For example, and without limitation, the sub-categories can include function name 234, time of day 236, content rating 238 and duration per day 240. The embodiment may default to denying the user access to any computer function that is not on a computer function list.

Function name sub-category 234 is used to deny or enable a user access to computer functions. In one implementation, for example, access is denied to all computer functions except those specifically enabled in the settings. This implementation controls new functions that are added after the administrator configures the system by denying access. Initially, a list is created that includes all computer functions. Each function on the list can be enabled or disabled by the administrator. As one who is skilled in the art will understand, this could be accomplished in a variety of ways. For example, to create a list of available applications for a computer, directories can be searched to gather executable file names, a list maintained by the operating system such as the WINDOWS Add/Remove Programs list can be used, or other methods can be employed. The list of available computer functions such as applications can also be presented in many ways. For example, the list could be presented in a window with enable and disable radio buttons, or with check boxes to enable a specific function, or in any of a number of other fashions.

If the administrator has indicated through function name sub-category 234 that a particular user is to be denied access to a particular function, that function can be disabled in various ways. For instance, in the WINDOWS operating software Internet access is blocked by extending the WINDOWS Firewall to block all Internet usage at the WINSOCK level.

As described above, another sub-category of functions 226 is the time of day sub-category 236. Restricting computer function access based on time of day 236 is used to deny a user access to a specific computer function except during allowable hours of operation as defined in the settings. These settings can be configured in the same way as the function name settings discussed above. In this way, a child would be allowed to use an otherwise "off-limits" function, such as an Internet browser, DVD player, or an application such as a computer game for a set time during the day.

Restricting computer function access based on content rating sub-category 238 involves denying a user access to all computer functions considered inappropriate for the user as defined in the settings. This sub-category is used for those items on a computer that have existing content ratings. As one who is skilled in the art could appreciate, for example, a Game Definition File can be read to obtain a content rating of a computer game. This content rating is then compared against what is allowed for a user as defined in the settings. In this way, the content rating controls whether the user may access the computer function. For example, the user authorization settings could be configured so that a teenage child is authorized to play an M-rated computer game on a home computer, but a young child is denied access to the same game on the same home computer.

Function duration per day sub-category 240 is used to deny a user access to a specific computer function after the duration of the function's process time equals or exceeds the allowable duration per day as defined in the settings. In this way, a child's daily access to computer games can be limited to an amount defined by the parent. In another example, a computer system administrator is able to ensure that common resources such as site licenses for an electronics simulation program are not monopolized by a handful of users. Restricting computer function access based on function duration per day is implemented by extending the WINDOWS kernel to track process time, when the WINDOWS operating software is being used. Other implementations of restricting computer function access based on the function duration per day are, of course, included within the present invention.

The restrictions component 214 thus allows an administrator to define a variety of different restrictive settings. These settings are individualized on a per user basis and follow the user throughout the network.

Exceptions

As stated above, the system controls 210 include an exceptions component 216. Exceptions component 216 is used to modify restrictions within restrictions component 214 that have been imposed on a user. Exceptions component 216 includes a reducing component 242 and an increasing component 244. Components 242 and 244 are used to override selected settings established within restrictions component 214.

Reducing component 242 is used to temporarily reduce user privileges by temporarily denying a user access to all computer functions or by temporarily denying access to a specific computer function. Reducing component 242 can deny a user logon status until a certain date has arrived, until a certain time has elapsed, or can deny a user access to a specific function until a certain date has arrived, or until a certain time has elapsed. As one with ordinary skill in the art would understand, the system clock combined with information from the settings can be used to implement reducing component 242. In this way, a parent could prevent a child from using a home computer by configuring the settings to deny the child logon status for a chosen period of time. For example, a child's access to all computer games on a system could be denied until the day after the child's math final.

Similarly, increasing component 244 can temporarily increase user privileges 244 by temporarily allowing a user access to computer functions that would typically be denied by the settings of restrictions component 214. An embodiment of this feature is described later in the flowchart of FIG. 4. This feature of the invention can be implemented, for example, by extending the existing WINDOWS technology of INSTANT MESSAGING and interfacing with the settings.

Figure 3:
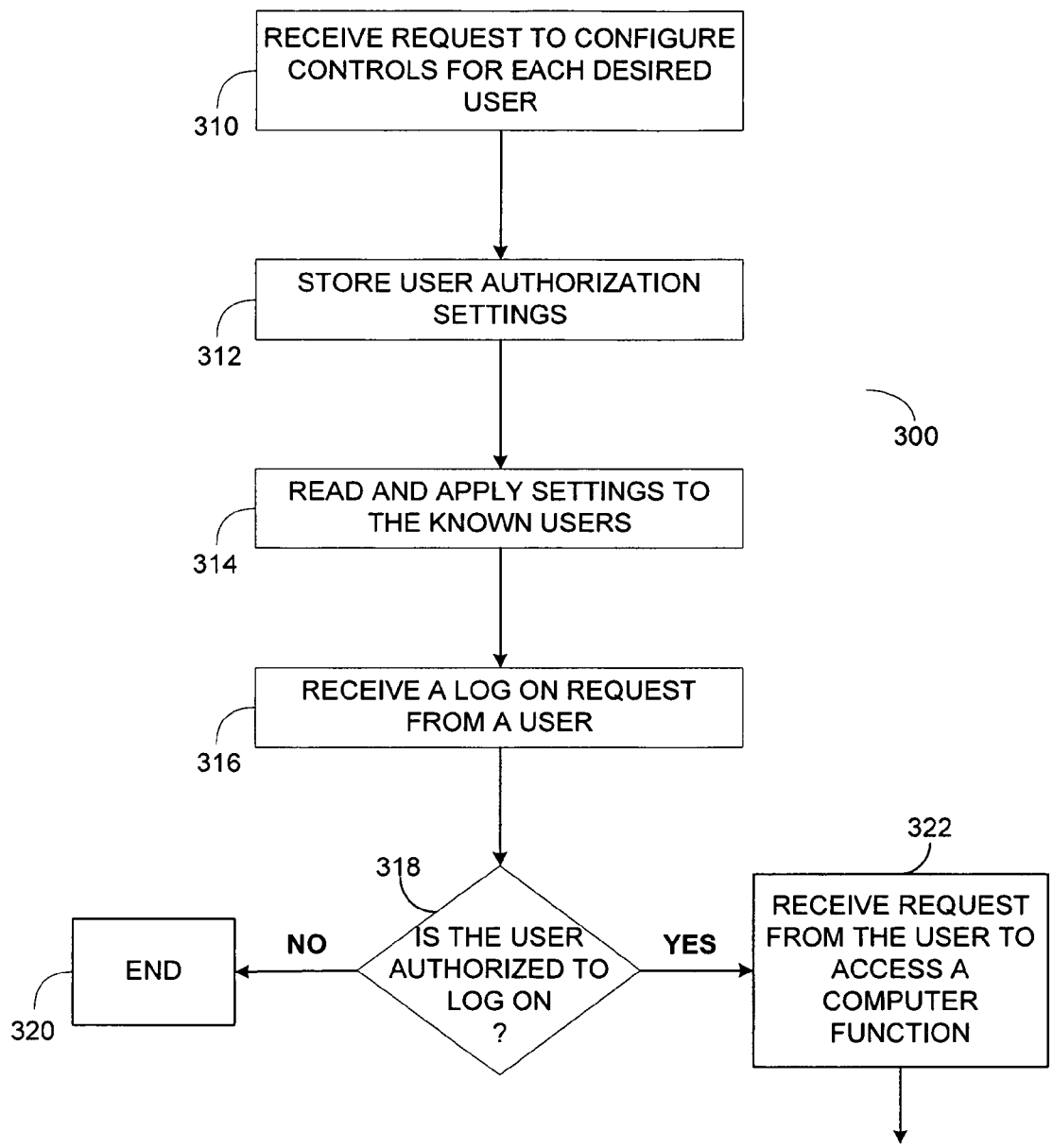
FIG. 3 is a flow chart illustrating an overview of the present invention.
Figure 3A:
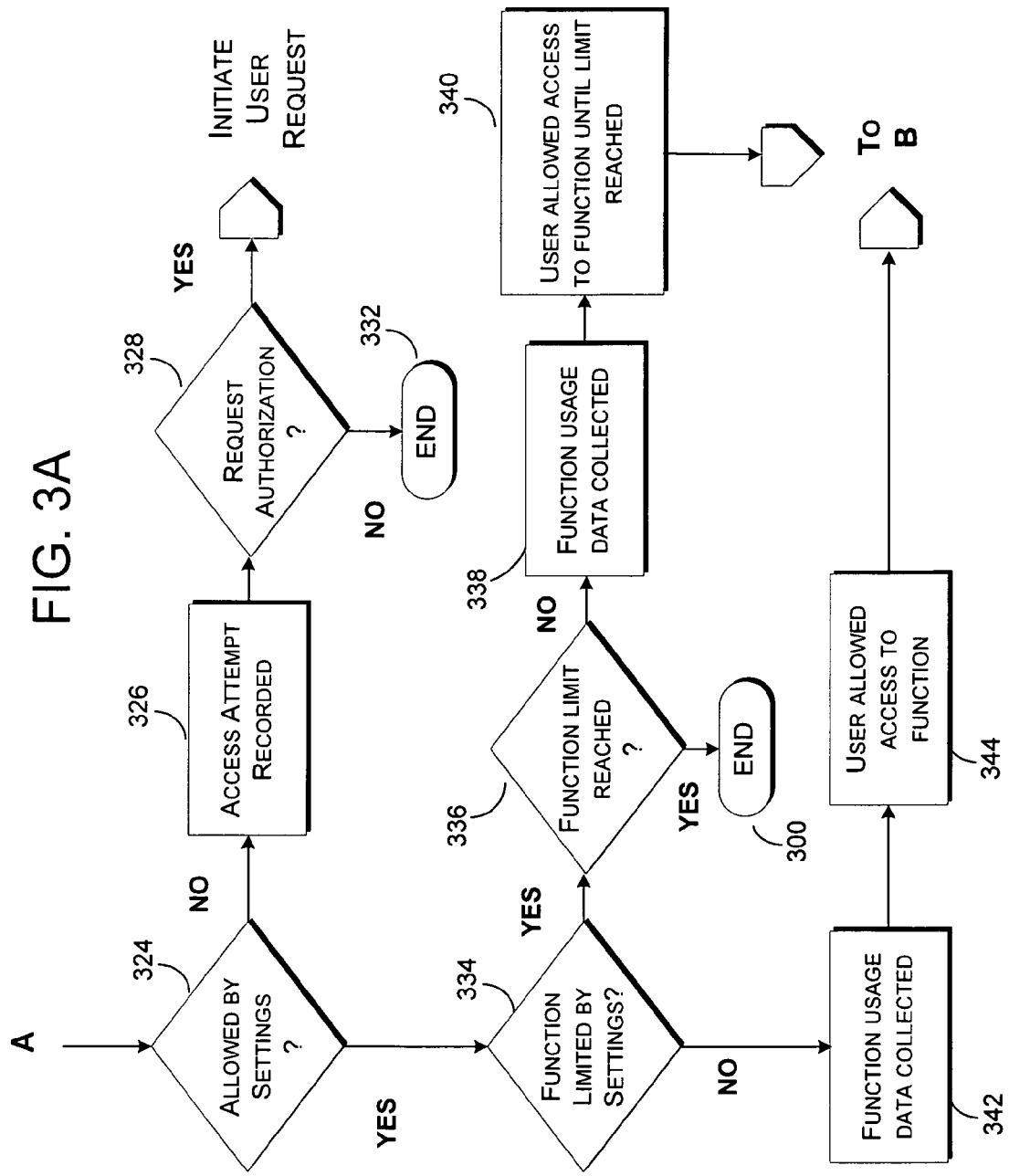
FIG. 3A is a continuation of FIG. 3.

Having described the various types of controls implemented by the invention, the method and implementation will be described with reference to FIG. 3. The method begins at step 310 whereupon the controls 210 described above are configured for each desired user of a computer or network of computers. The setting or configuration is done by the administrator, such as the parent. This process is preferably simplified by providing a wizard, through which the administrator is guided. The wizard presents the various restrictions 224, 226 discussed above. The administrator can thus easily set time of day restrictions or content rating restrictions, for example, and can also specify which reports, if any are desired. The controls imposed upon each user are individualized. However, group policies can also be configured which may override individual controls. In step 312, the configured user authorization settings are stored as GPOs. The GPOs are sent to other computers that have a communications link, such as other computers on the same network. In this way, all connected computers contain the same system authorization settings for all users. This prevents a user, such as a child, from circumventing the restrictions by moving to another computer within the home or connected to the network. In step 314, each computer reads the settings contained in the GPOs and applies them to the known system users. This can be done, for example, by a Group Policy Engine on the computer programmed to access the group policy objects and to interact with the operating system to enforce the user authorization settings contained therein. Then, in 316, the computer in question waits for a user to attempt to log on. When a logon attempt does occur, the restrictions component is used to determine whether a logon is to be allowed. This determination is made by comparing the settings configured by the administrator against the user environment, such as whether the user has exhausted the available computer time for the day. If, at step 318, the settings and user environment dictate that logon status be denied, the user is not allowed into the system as shown at 320. If at step 318, the computer system authorization settings allow the user logon status, the user is allowed into the system. The user is then free to attempt to access computer functions in step 322. Turning to FIG. 3A, it is next determined at 324 whether the function is allowed to be accessed by the configured settings. If the attempt is not allowed by the system authorization settings in step 324, the failed attempt is recorded in step 326. The user may then be queried to request authorization for a temporary increase in user privileges, as shown at 328. If the user does desire a temporary extension in privileges, the Temporary Extension of Privileges Process is initiated in step 330. This process is described below with reference to FIG. 4. If a user does not desire to request an extension in privileges, the process ends as shown at 332.

If the user's function access attempt of step 322 is allowed by the computer system authorization settings at step 324, the settings are checked to determine if the function requested is limited in some manner, such as by a time or rating limitation, at step 334. If the function is limited, a determination is made at 336 as to whether the limit has been reached. If the limit has not been reached, data is collected on function usage in step 338 and is included in the user activity data 218. As shown at step 340, the user is allowed to use the requested computer function until the limit allowed by the settings has been reached. The function then terminates, and the user is returned to step 322 (FIG. 3) as the system waits for another authorization request.

If the user requested function of step 322 is not limited by the settings, in step 342 data is again collected on function usage and is included in the user activity data 218. In step 344, the user is allowed access to the requested function until the user terminates the function. The user is then returned to step 322.

Figure 4:
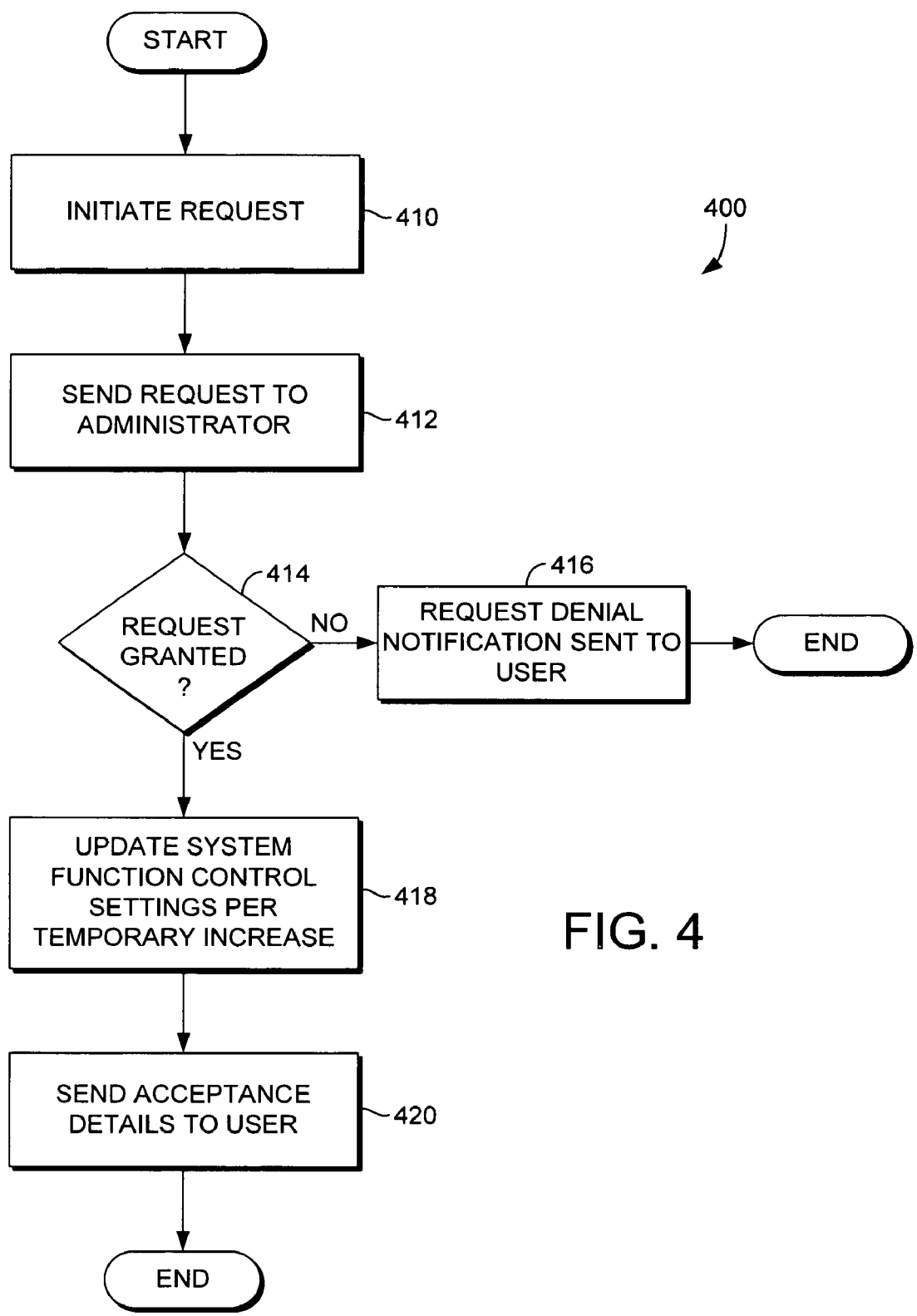
FIG. 4 is a flow chart illustrating an overview of the process that enables an administrator to temporarily extend the computer system authorization privileges of a user.

FIG. 4 is a flow chart that depicts the general process employed by increasing component 244 for temporarily increasing user privileges 400. The method begins at step 410 when a request for a temporary increase in user privileges is initiated by a user, as indicated in FIG. 3A at 330. In step 412, the request is sent to the party responsible for handling user requests, such as a parent or a system administrator. The system administrator can then allow the access or not, as shown at 414. If the request is rejected in step 414, a rejection notification is sent to the user in step 416, and the request process ends.

If in step 414 the request is granted, the user's access settings are updated to reflect the temporary increase in user privileges in step 418. The user's computer will be updated with the new settings by distributing new GPOs to all computers that are linked to the administrator's computer as part of the administrator's local network. Finally, in step 420, the user is notified of their request acceptance and the details of the privilege increase.

Figure 5:
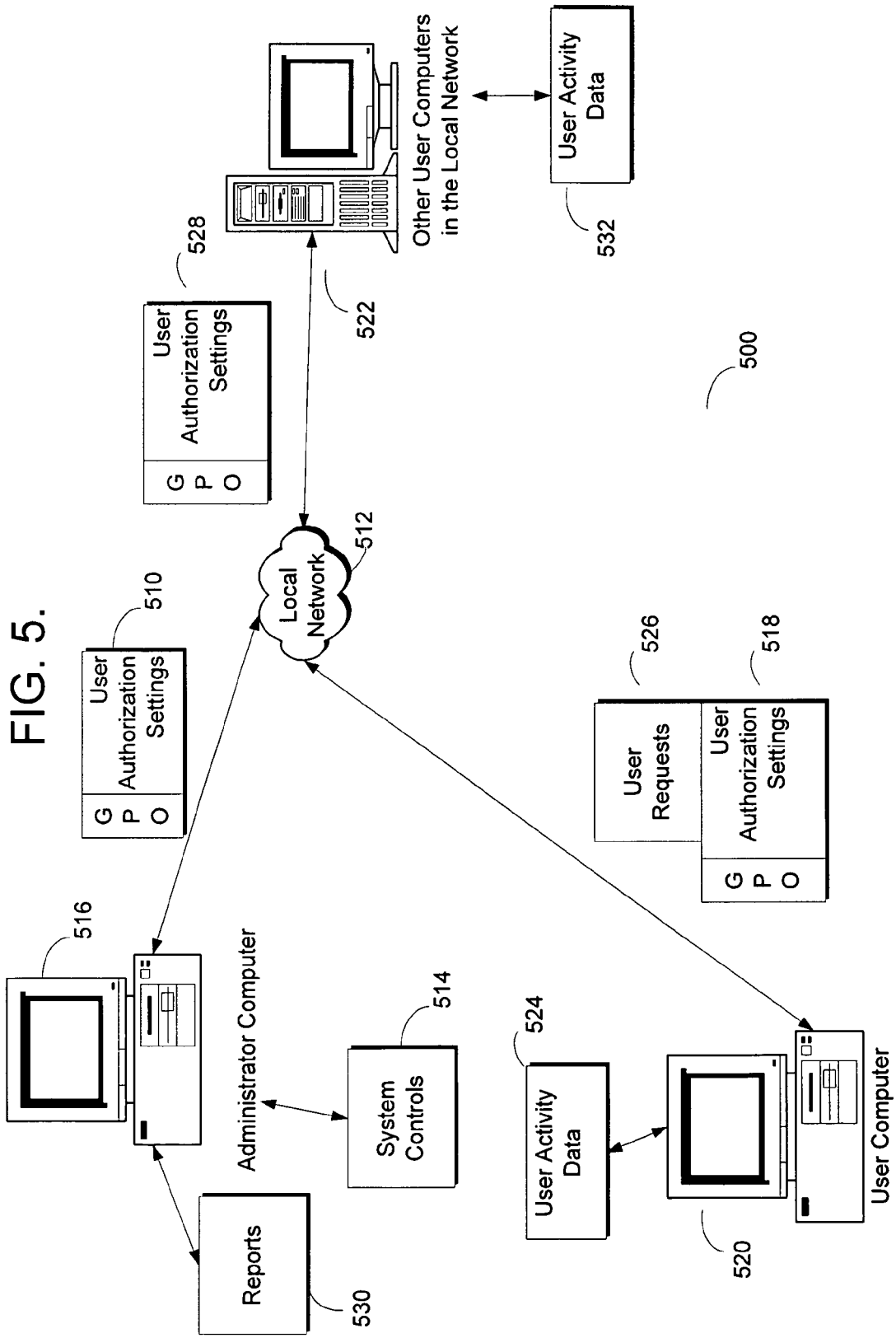
FIG. 5 depicts an embodiment of the system of the present invention

FIG. 5 is an embodiment of the system 500 of the present invention. Group policy objects 510 which circulate around a local network 512 hold the user authorization settings that have been configured through the system controls 514 typically through an administrator's computer 516. The local network 512 needed to support the invention could be a traditional LAN or WAN. However, it could also be any communications link between two or more computers. So, to be part of the local network 512, a computer needs to be able to communicate with at least one other computer in the local network 512 and needs to be identified as part of the local network 512. The group policy objects 510 generated by the system controls 514 flow through the network 512 and are received in a group policy object 518 on a user computer 520 and on other user computers 522 belonging to the local network 512. Once a user's computer has received the group policy object 518 containing a user's authorization settings, the user's computer activities will be monitored and selectively limited as described in the settings. Thus, when a request from the user to perform an action on the computer is received on the computer, the computer determines, based on the user authorization settings whether the user is authorized to perform the action on the computer and, if so, performs the action. User activity data 524 is stored in a system log on the user's computer. The request to perform an action on the computer may be a request to perform a computer function, such as to use the DVD drive, or it may be a request to execute an application. A user wishing to temporarily increase their privileges may make a user request 526 which is sent through the local network 512 to the administrator computer 516. When an administrator approves such a request, the user is notified and the user's authorization settings are updated appropriately. This causes another group policy object 510 to be distributed through the local network 512 which is received by the user's computer 520 and all other user computers in the local network 522. When a user moves from one computer to another user computer in the local network 512, the group policy objects 528 on the new computer will be the same as those controlling the user's actions on their original user computer 520. Reports 530 of the user's activities can be generated by the administrator computer 516 based on user activity data 524, 532 collected from all computers in the local network 512 and filtered as desired through the system controls 514. The administrator computer 516 may also view the video output of any user in the local network.

From the foregoing, the invention can be seen to provide a parent with a valuable way to limit and monitor a child's computer use. The various computer systems and components shown in FIGS. 1-5 and described in the specification are merely exemplary of those suitable for use in connection with the present invention. For example, other embodiments are contemplated hereby, such as using other operating systems. Accordingly, the scope of the present invention is defined by the appended claims rather than the foregoing description.

We claim:

1. A method for selectively limiting a user's use of a computer in a local network wherein at least one computer in the local network has a group policy object for the user, comprising:

receiving on the computer at least one group policy object containing user authorization settings for at least one user, the user authorization settings including one or more defined time periods during which the user is authorized to use the computer;

transmitting a request to temporarily modify the user authorization settings by modifying at least one of the one or more defined time periods, wherein a temporary modification overrides at least one user authorization setting until a certain date or until a certain time has elapsed;

receiving from the user a request to perform an action on the computer;

determining based on the user authorization settings whether the user is authorized to perform the action on the computer, and, if so, performing the action, and terminating the user's use of the computer outside of the one or more defined time periods during which the user is authorized to use the computer.

2. The method of claim 1, wherein the request to perform an action is a request to log on to the computer.

3. The method of claim 1, wherein the request to perform an action is a request to perform a computer function.

4. The method of claim 1, wherein the request to perform an action is a request to execute an application.

5. The method of claim 1, further comprising saving a state of the computer when terminating the user's use of the computer.

6. The method of claim 1, wherein the user authorization settings include settings to deny or grant a user access to a computer function, the settings contained in a computer functions list having applications installed on the computer, wherein the computer functions list includes for at least one computer function one or more time periods during which the user is authorized to use or restricted from use of the computer function.

7. The method of claim 6, wherein the computer functions list includes for at least one computer function one or more time periods during which the user is authorized to use the computer function; and wherein the method further comprises terminating the user's use of the computer function outside of the one or more time periods during which the user is authorized to use the computer function.

8. The method of claim 7, further comprising saving a state of the computer when terminating the user's use of the computer function.

9. The method of claim 6, wherein the computer functions list includes for at least one computer function an associated content rating for determining whether the user may or may not access the at least one computer function.

10. The method of claim 1, further comprising receiving updated user authorization settings after transmitting the request to temporarily modify the user authorization settings.

11. The method of claim 10, wherein the updated user authorization settings are contained in a group policy object.

12. A method for monitoring and selectively limiting a user's use of a computer in a local network, wherein each computer in the local network is adapted to receive a group policy object and based thereon to selectively limit the user's use of the computer comprising:

receiving first user authorization settings for at least one user, the user authorization settings including one or more defined time periods during which the user is authorized to use the computer;

receiving a request to temporarily modify the first user authorization settings, wherein a temporary modification overrides at least one user authorization setting until a certain date or until a certain time has elapsed;

storing the first user authorization settings in a group policy object; and transmitting the group policy object to at least one computer in the local network; and terminating the user's use of the computer outside of the one or more defined time periods during which the user is authorized to use the computer.

13. The method of claim 12, further comprising configuring the first user authorization settings to limit the user's use of the computer.

14. The method of claim 13, wherein the first user authorization settings are configured to authorize a user to log on to or restrict a user from logging on to the computer.

15. The method of claim 12, further comprising configuring the first user authorization settings to limit user activity collected in a user activity log.

16. The method of claim 12, further comprising, modifying the first user authorization settings in accordance with the received request to produce updated user authorization settings; and transmitting a group policy object containing the updated user authorization settings.

17. The method of claim 16, wherein the updated user authorization settings expire after a specified time period and the user authorization settings revert to the first user authorization settings.

18. The method of claim 12, further comprising displaying on another computer in the local network the content of a video display associated with the user's computer.

19. A computer-readable recording medium containing computer executable instructions for performing a method for monitoring and selectively limiting a user's use of a computer in a local network, wherein each computer in the local network is adapted to receive a group policy object and based thereon to selectively limit the user's use of the computer, the method comprising:

receiving first user authorization settings, for at least one user, the first user authorization settings including one or more defined time periods during which the user is authorized to use the computer and one or more computer functions for which the user's use is authorized or restricted:

receiving a request to temporarily modify the first user authorization settings, wherein a temporary modification overrides at least one user authorization setting until a certain date or until a certain time has elapsed;

storing the first user authorization settings in a group policy object;

transmitting the group policy object to at least one computer in the local network;

displaying on another computer in the local network at least one window that the user views on the user's computer, and terminating the user's use of the computer outside of the one or more defined time periods during which the user is authorized to use the computer.

* * * * *

UNITED STATES PATENT AND TRADEMARK OFFICE
CERTIFICATE OF CORRECTION

PATENT NO. : 7,818,789 B2  
APPLICATION NO. : 12/019438  
DATED : October 19, 2010  
INVENTOR(S) : Craig Adam Beilinson et al.

It is certified that error appears in the above-identified patent and that said Letters Patent is hereby corrected as shown below:

In column 12, line 37, in Claim 1, delete "action," and insert -- action; --, therefor.

In column 13, line 26, in Claim 12, after "object;" delete "and".

Signed and Sealed this
Seventeenth Day of May, 2011

David J. Kappos
*Director of the United States Patent and Trademark Office*